Figure 1:
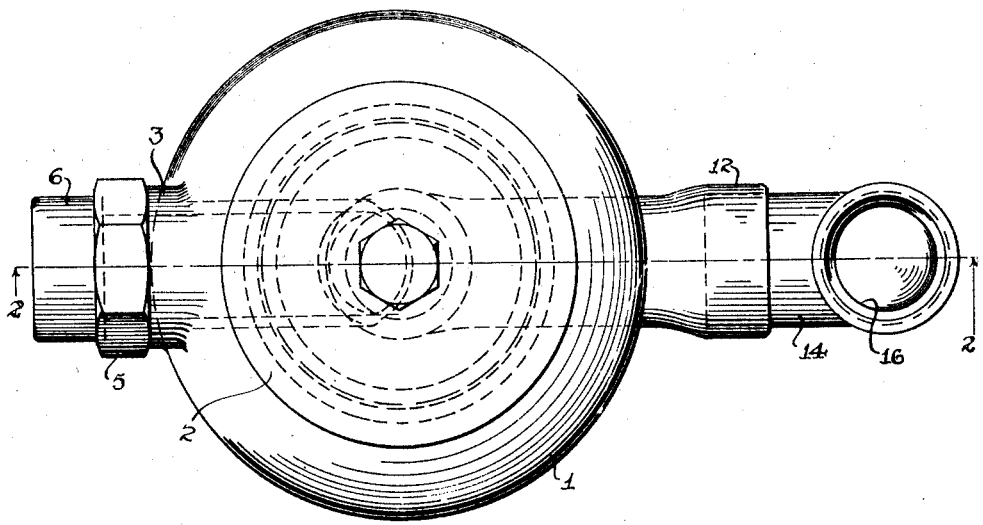

July 3, 1928.  1,675,409

H. A. GARDNER, SR.

ANTISIPHON TRAP

Filed Feb. 10, 1927

INVENTOR
Harold A. Gardner Sr.
BY
H. H. Simms
his ATTORNEY

Patented July 3, 1928.

1,675,409

UNITED STATES PATENT OFFICE.

HAROLD A. GARDNER, SR., OF ROCHESTER, NEW YORK.

ANTISIPHON TRAP.

Application filed February 10, 1927. Serial No. 167,084.

The present invention relates to antisiphon traps, and an object of the invention is to provide a construction which will be free from interior partitions and which, at the same time, may be readily cleaned and may be adjusted to meet different conditions.

To these and other ends, the invention consists of certain parts and combinations of parts, all of which will be hereinafter described, the novel features being pointed out in the appended claims.

Figure 2:
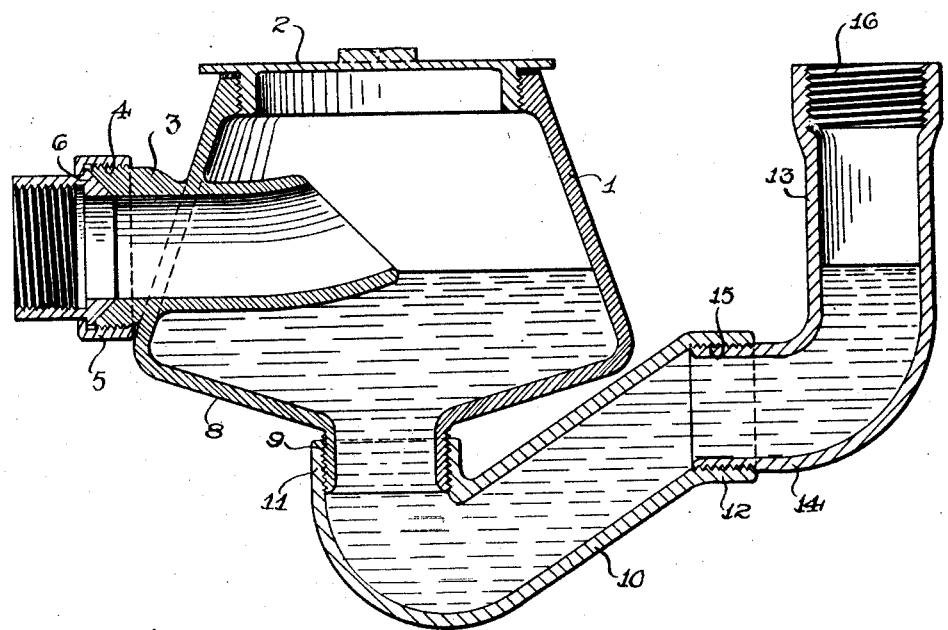

In the drawings:

Fig. 1 is a plan view of a trap constructed in accordance with this invention; and Fig. 2 is a vertical section on the line 2—2, Fig. 1.

In the illustrated embodiment there is employed a body portion 1, the walls of which taper upwardly to a top having a clean out opening closed by a closure or plug 2. The purpose of so forming the body is to provide a large capacity at the bottom of the body, while having a small top. The bottom 8 of the trap body 1 tapers toward a center inlet 9 formed in a nipple which projects from the bottom 8 and is externally threaded.

To this inlet nipple 9 a sealing portion 10 is secured. This sealing portion has its outlet end 11 opening upwardly and internally threaded, so as to receive the externally threaded nipple 9 of the body 1. It is apparent that through this screw threaded connection the sealing portion 10 may be arranged or adjusted at different angles with reference to the body of the trap. The inlet end 12 of the sealing portion 10 opens horizontally, a portion of the opening at least being in the plane above the outlet end of said sealing portion.

There is also employed in connection with the trap a terminal inlet portion comprising an upright portion 13 having a laterally turned outlet portion 14 externally threaded at 15 to engage either directly with the inlet portion 12 of the sealing portion 10, or to be connected with said inlet portion 12 by an interposed horizontal piping in order to position the terminal portion 13 at a greater distance from the body 1 than that herein shown. The terminal portion has an upwardly opening inlet end 16, in this instance, internally threaded for connection with the plumbing fixture.

The outlet to the body consists of a short pipe section 3, integral with the body and having, in this instance, an outwardly extending portion which is externally screw threaded at 4 and engaged by a collar 5 that cooperates with an internally threaded bushing 6. The end of the bushing is tapered to cooperate with a flared portion on the projecting part of the pipe section 3. The pipe section 3 also projects within the body and has its inner end deflected slightly upwardly at its end beneath the closure 2, the lowermost portion of the edge of the inlet piping being below that portion diametrically opposite and serving to define the liquid level of the trap. This facilitates the introduction of cleanout devices into the pipe section 3 through the opening closed by the closure 2.

The liquid fills the body of the trap to the lowermost edge of the outlet piping 3, and extends into the terminal portion to a point in the upright portion 13 on the level with the lower edge of the outlet pipe 3. This construction is such that in flushing the trap sufficient liquid will be maintained therein to fill the sealing portion 10 above the top of the bend, so that at all times a seal is maintained and complete siphoning of the trap is prevented.

The trap body tapers upwardly so that a small closure may be employed while making it possible to provide sufficient liquid capacity at the bottom of the body to maintain the seal. The outlet projects into the body and is curved upwardly toward a clean-out opening closed by the removable cover 2, so that the cleaning of the outlet may be readily effected. The bottom of the body tapers downwardly toward a central outlet so that the bottom is maintained in a clean condition. A sealing portion connects with the inlet of the body by a joint which permits the angular relation of the sealing portion to the inlet to be changed to meet different conditions. The terminal portion is provided separate from the sealing portion, permitting said terminal portion to be directly connected to the sealing portion or to be indirectly connected thereto through an interposed horizontal piping when it is desired to situate the terminal portion at some distance from the body of the trap. The trap has no interior partitions which are liable to corrode and interfere with the operation of the trap. The body is always shaped to prevent siphoning. It always maintains a sufficient amount of water to fill the sealing portion of the air break occurring in the trap.

What I claim as my invention and desire to secure by Letters Patent is:

1. An anti-siphon trap comprising a body having outside walls tapering upwardly and extending to the top wall from a point below the outlet of the trap and a bottom wall tapering toward its center, said body having a cleanout closure at the top and an inlet at center of its bottom, an outlet connecting the body above the bottom, a sealing portion connecting with the inlet at the center of the body, and a terminal inlet portion projecting above the water level of the body and connected with said sealing portion.

2. An anti-siphon trap comprising a body having a cleanout plug at its top and a bottom provided with an inlet, an outlet projecting into the body in spaced relation to the bottom and having its end deflected slightly toward the cleanout plug, one portion of the edge of said outlet being below that portion diametrically opposite and providing a liquid level below the uppermost portion of the edge of the outlet, a sealing portion leading to the inlet opening of the body, and a terminal inlet portion connecting with the sealing portion and extending upwardly above the liquid level determined by the lowermost portion of the edge of the outlet.

HAROLD A. GARDNER, Sr.